United States Patent
Mano et al.

(10) Patent No.: US 10,611,305 B2
(45) Date of Patent: Apr. 7, 2020

(54) CAMERA MONITOR SYSTEM

(71) Applicant: KOITO MANUFACTURING CO., LTD., Tokyo (JP)

(72) Inventors: Mitsuharu Mano, Shizuoka (JP); Kosuke Mitani, Shizuoka (JP); Naoki Tatara, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/701,715

(22) Filed: Sep. 12, 2017

(65) Prior Publication Data

US 2018/0072228 A1 Mar. 15, 2018

(30) Foreign Application Priority Data

Sep. 15, 2016 (JP) ................. 2016-180114

(51) Int. Cl.
| | | |
|---|---|---|
| *H04N 17/00* | (2006.01) | |
| *B60R 1/00* | (2006.01) | |
| *H04N 5/217* | (2011.01) | |
| *H04N 5/232* | (2006.01) | |
| *H04N 7/18* | (2006.01) | |
| *H04N 5/57* | (2006.01) | |
| *H04N 5/63* | (2006.01) | |

(52) U.S. Cl.
CPC ............ *B60R 1/00* (2013.01); *H04N 5/217* (2013.01); *H04N 5/23293* (2013.01); *H04N 7/181* (2013.01); *H04N 17/002* (2013.01); *B60R 2300/105* (2013.01); *B60R 2300/40* (2013.01); *B60R 2300/70* (2013.01); *B60R 2300/802* (2013.01); *B60R 2300/8046* (2013.01); *B60R 2300/8066* (2013.01); *H04N 5/23245* (2013.01); *H04N 5/57* (2013.01); *H04N 5/63* (2013.01)

(58) Field of Classification Search
None
See application file for complete search history.

(56) References Cited

U.S. PATENT DOCUMENTS

| | | | |
|---|---|---|---|
| 2010/0302019 A1 | 12/2010 | Birkemeyer et al. | |
| 2015/0165975 A1* | 6/2015 | Meadows | ............... B60R 1/006 |
| | | | 701/49 |

FOREIGN PATENT DOCUMENTS

| | | |
|---|---|---|
| EP | 2219151 A1 | 8/2010 |
| JP | 2015-226233 A | 12/2015 |
| WO | 2009/043783 A1 | 4/2009 |

OTHER PUBLICATIONS

Communication issued in French Application No. FR1758475, dated Apr. 29, 2019.

* cited by examiner

*Primary Examiner* — William C Vaughn, Jr.
*Assistant Examiner* — Stuart D Bennett
(74) *Attorney, Agent, or Firm* — Sughrue Mion, PLLC

(57) ABSTRACT

A camera monitor system includes: left and right capturing devices; left and right displaying devices; and a control device detecting an abnormality of each of the left and right capturing devices and controlling a displaying state of each of the left and right displaying devices based on the detected abnormality. The control device individually controls each of the left and right displaying devices to be in a low power consumption state in accordance with a mode of the detected abnormality.

5 Claims, 8 Drawing Sheets

FIG. 5

| | | DISPLAYING OF MONITOR DURING TRAVELING | MONITOR DISPLAYED DURING STOP | | | |
|---|---|---|---|---|---|---|
| | | | ABSENT | PRESENT | | |
| | | | | STRAIGHT | RIGHT INDICATION | LEFT INDICATION |
| | ABNORMALITY MODE | | | | | |
| RIGHT CAMERA / RIGHT MONITOR | COMPLETE FAILURE | UNLIT | UNLIT | UNLIT | UNLIT | UNLIT |
| | FROZEN | BLACKOUT | BLACKOUT | BLACKOUT | BLACKOUT | BLACKOUT |
| | IMAGE QUALITY DEGRADATION | DISPLAY | BLACKOUT | DISPLAYING/ BLACKOUT | DISPLAY | BLACKOUT |
| LEFT CAMERA / LEFT MONITOR | COMPLETE FAILURE | UNLIT | UNLIT | UNLIT | UNLIT | UNLIT |
| | FROZEN | BLACKOUT | BLACKOUT | BLACKOUT | BLACKOUT | BLACKOUT |
| | IMAGE QUALITY DEGRADATION | DISPLAY | BLACKOUT | DISPLAYING/ BLACKOUT | BLACKOUT | DISPLAY |

CAMERA MONITOR SYSTEM

INCORPORATION BY REFERENCE

The disclosure of Japanese Patent Application No. 2016-180114 filed on Sep. 15, 2016 including the specification, drawings and abstract is incorporated herein by reference in its entirety.

BACKGROUND

1. Technical Field

The disclosure relates to a camera monitor system (referred to as a CMS) that displays images captured by cameras provided on left and right sides of a vehicle on a monitor.

2. Description of Related Art

In recent years, a mirrorless vehicle has been taken into consideration. In Japanese Patent Application Publication No. 2015-226233 (JP 2015-226233 A), a CMS is proposed. Instead of left and right side mirrors of a vehicle, the CMS is configured by including: left and right side cameras that respectively capture a rear area of the vehicle from left and right side areas thereof; and a monitor that is disposed at a position where an occupant (a driver) in a vehicle cabin can visually recognize the monitor and that displays images captured by the side cameras. The plural occupants that include not only a driver but also include occupants in a passenger's seat and a rear seat can visually recognize the image displayed on the monitor, and thus, the CMS is extremely effective in securement of safe travel of the vehicle.

SUMMARY

In such a CMS, in the case where there occurs an abnormality in the system, in particular, an image capturing operation of the side camera itself is not performed normally, where an image processing circuit that executes signal processing of the image captured by the side camera fails, or the like, the image displayed on a monitor becomes blur, the image is frozen (the image is not displayed as a video, and the last still image remains to be displayed), or the image is no longer displayed.

In particular, when the image on the monitor is blurred, the occupant can no longer precisely recognize the side area to the rear area of the vehicle by the monitor. When the image on the monitor is frozen, the occupant erroneously recognizes that the frozen image shows the side area to the rear area of the vehicle at the time. In either case, there is a possibility that the occupant cannot precisely recognize the side area to the rear area of the vehicle. In addition, in the case where the CMS is normally controlled even during occurrence of the abnormality in the system as described above, the monitor cannot display the image normally, but power keeps being consumed. This is unfavorable in terms of power saving in an electric vehicle, a hybrid vehicle, or the like that has a battery as a power supply.

The disclosure provides a CMS capable of securing safety of a vehicle by preventing an occupant (a driver) from erroneously recognizing an image displayed on a monitor and realizing power saving even when an abnormality occurs to the system.

A camera monitor system according to an aspect of the disclosure includes: left and right capturing devices respectively capturing images of left and right areas outside of a vehicle; left and right displaying devices displaying the images captured by the left and right capturing devices; and a control device detecting an abnormality of each of the left and right capturing devices and controlling a displaying state of each of the left and right displaying devices based on the detected abnormality. The control device individually controls each of the left and right displaying devices to be in a low power consumption state in accordance with a mode of the detected abnormality.

In the above aspect, the camera monitor system may further include a state detection device detecting a state of the vehicle. The control device may control each of the left and right displaying devices to be in the low power consumption state in accordance with a combination of the detected state of the vehicle and the mode of the detected abnormality.

In the above aspect, the control device may control each of the left and right displaying devices to an unlit mode, a blackout mode, or a displaying mode as the low power consumption state. In the above aspect, as the mode of the abnormality of each of the left and right capturing devices, the control device may detect any one of a complete failure state, a frozen state, and an image quality degradation state. In the above configuration, the control device may control each of the left and right displaying devices to be in an unlit mode, a blackout mode, or a display mode, in accordance with a combination of a state where the vehicle is traveling or stopped, a state where a driver is in the vehicle or outside the vehicle, a blinking state of each of left and right turn signal lamps of the vehicle, and detected one of a complete failure state, a frozen state, or an image quality degradation state. In addition, in the above aspect, the control device may turn off the control to the low power consumption state through an operation by a driver.

According to the disclosure, when the abnormality occurs to the capturing devices, the displaying devices are controlled to be in the different displaying modes on the basis of the state of the vehicle and the mode of the detected abnormality at the time. Therefore, safety is secured by preventing erroneous recognition of a peripheral environment of the vehicle by the occupant (a driver) through displaying of the monitors, and the system can be controlled to low power consumption.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a table of monitor control by the CMS;

DETAILED DESCRIPTION OF EMBODIMENTS

Figure 1:
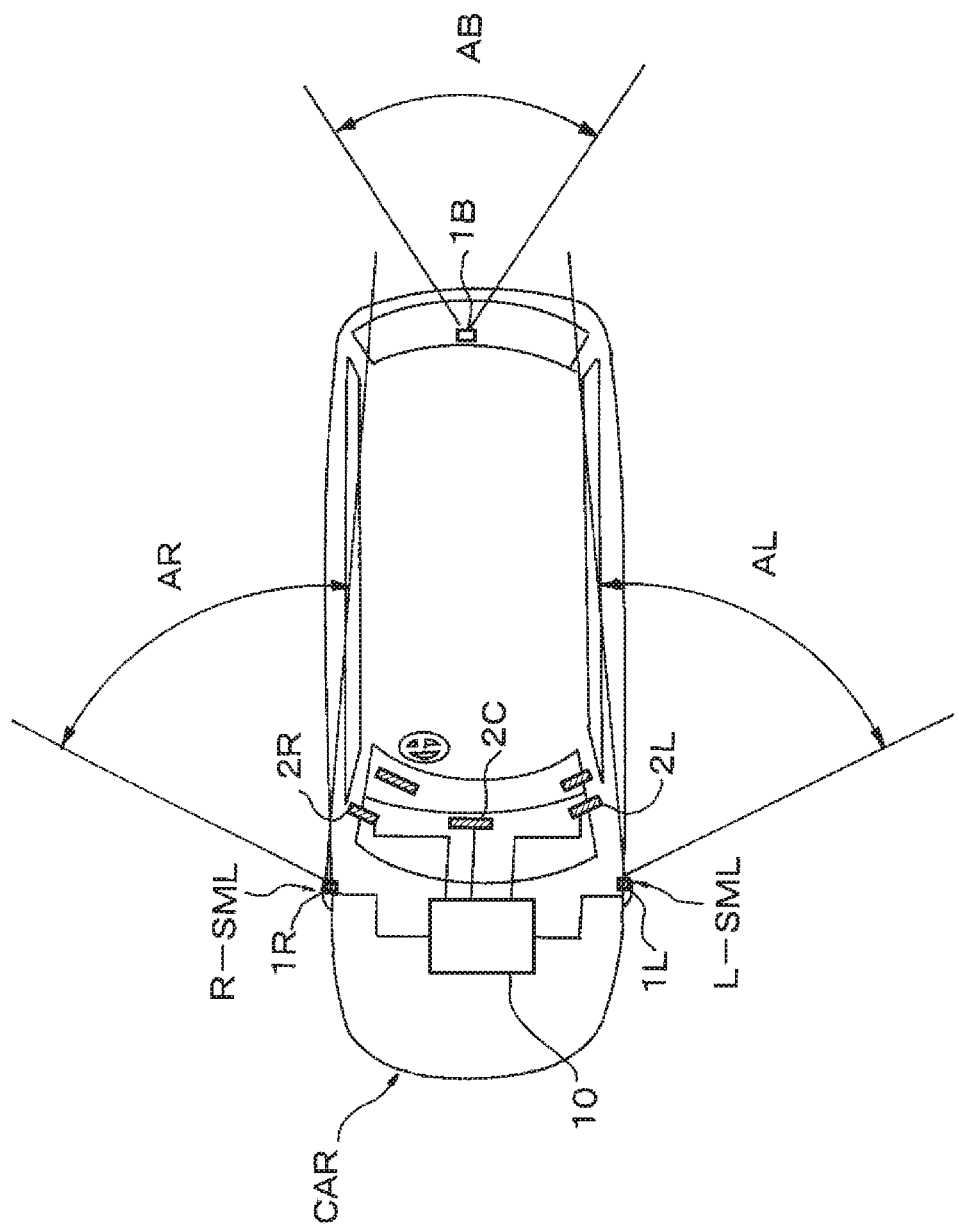
FIG. 1 is a schematic plan view of a vehicle that includes a CMS of the disclosure.

Next, a description will be made on an embodiment of the disclosure with reference to the drawings. FIG. 1 is a schematic configuration diagram of a vehicle on which a CMS of the disclosure is mounted. Side mirrors are not provided on left and right sides on an outside of a vehicle body of a vehicle CAR. Left and right side cameras 1L, 1R are respectively disposed in an integrated manner with left and right side marker lamps L-SML, R-SML. Each of the side marker lamps functions as a blinker that indicates a left or right travel direction of the vehicle, that is, a turn signal lamp. The left side camera 1L captures an image from a left side area to a rear left area AL of the vehicle CAR. The right side camera 1R captures an image from a right side area to a rear right area AR of the vehicle CAR. Hereinafter, both of the side cameras 1L, 1R may collectively be referred to as a camera 1.

Figure 2:
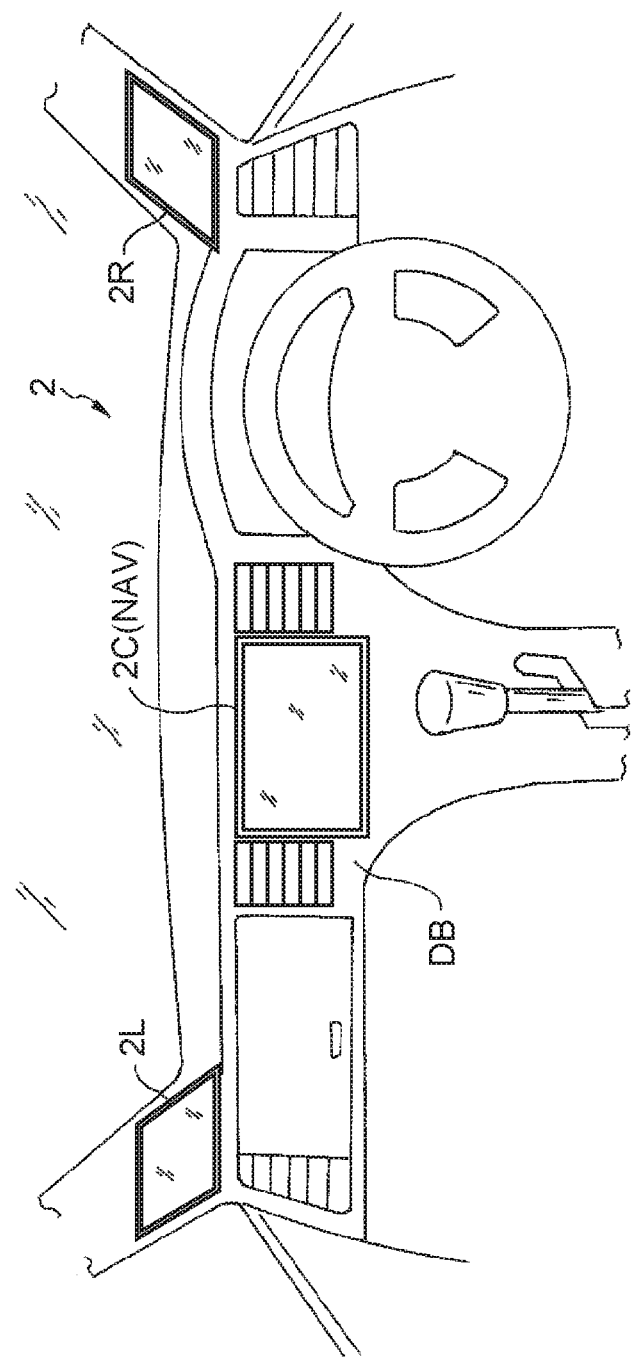
FIG. 2 is a schematic view of a dashboard showing a monitor configuration.

FIG. 2 is a schematic view of a dashboard DB of the vehicle CAR. In the drawing, three monitors are aligned in a horizontal direction. Center one is a center monitor 2C, and a left side monitor 2L and a right side monitor 2R are respectively disposed at left and right ends of the dashboard DB, that is, in inner areas of left and right front pillars. The center monitor 2C is configured herein as a display screen of a navigation system NAV. The left side monitor 2L displays the image captured by the left side camera 1L, and the right side monitor 2R displays the image captured by the right side camera 1R. Hereinafter, both of the side monitors 2L, 2R may collectively be referred to as a monitor 2.

The left and right side cameras 1L, 1R and the left and right side monitors 2L, 2R described above are electrically connected to a CMS body 10 shown in FIG. 1. Through control by this CMS body 10, displaying of the captured images is controlled. This CMS body 10 will be described below.

Figure 3:
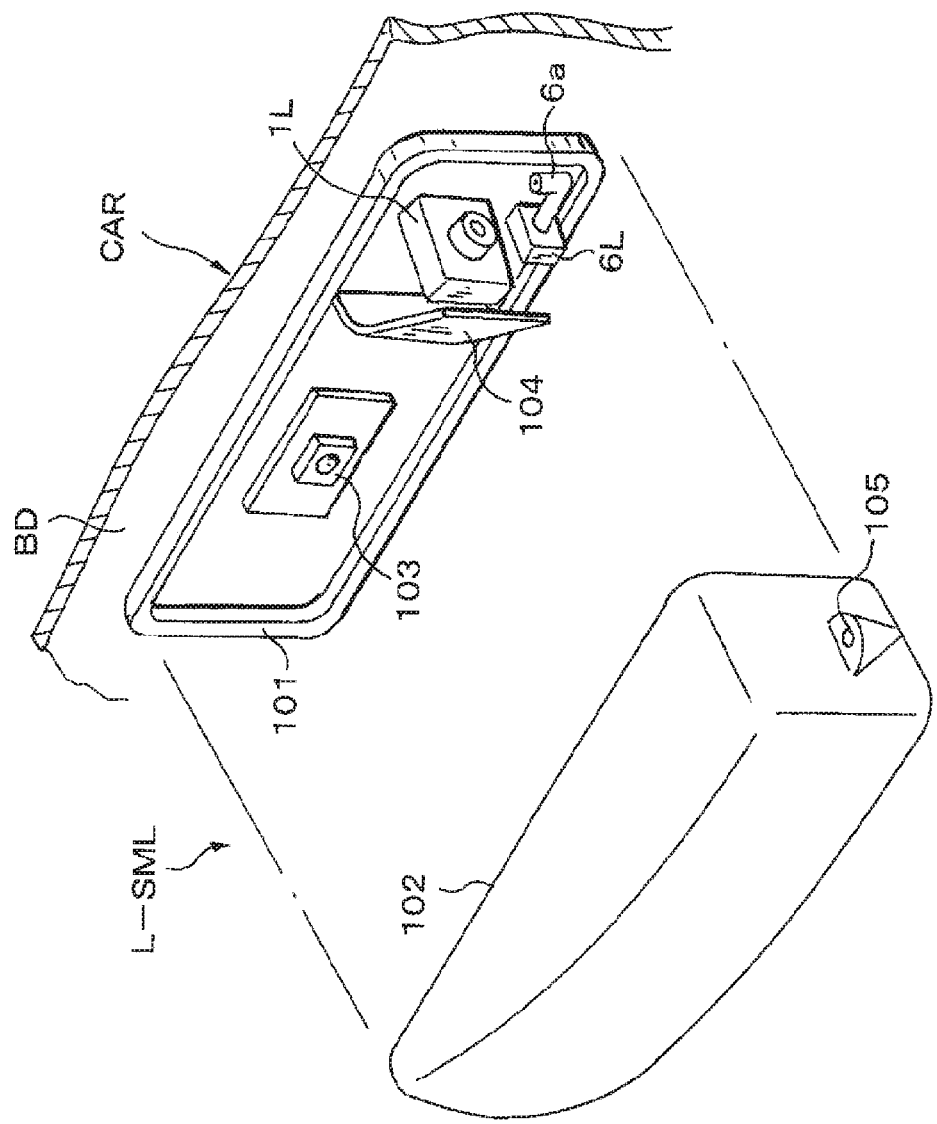
FIG. 3 is an exploded perspective view of a left side marker lamp.

FIG. 3 is an exploded perspective view of a schematic configuration of the left side marker lamp L-SML among the left and right side marker lamps. A lamp housing is configured by including: a substantially rectangular base 101 that is a part of a vehicle body BD of the vehicle and that is attached to a left fender for example; and a translucent outer cover 102 that is attached to this base 101 in a manner to cover a surface of said base 101. An LED (a light-emitting diode) 103 as a light source of the side marker lamp is disposed in a front area of the base 101 (in regard to a longitudinal direction, a longitudinal direction of the vehicle is set as a reference). The left side camera 1L is disposed in a rear area with a light-shielding wall 104 being interposed between this LED 103 and the left side camera 1L.

In said rear area of the base 101, a left cleaner 6L that cleans a rear surface of the outer cover 102 is disposed in a lower area of the left side camera 1L. This left cleaner 6L is configured herein to spray the rear surface of the outer cover 102 with air to remove dust and the like that are attached to said rear surface, and extends in a state where a nozzle 6a, from which the air is sprayed, is bent upward from the rear. On the rear surface of the outer cover 102, an opening 105 that corresponds to the nozzle 6a is disposed in a lower portion of an area that opposes an image capturing area of the left side camera 1L. In this way, the air, which is sprayed from the left cleaner 6L, cleans the rear surface of the outer cover 102 through the opening 105.

The same applies to the right side marker lamp R-SML. Although not shown, a right cleaner 6R is disposed with the right side camera 1R in a lamp housing thereof. Hereinafter, both of the left and right cleaners 6L, 6R may collectively be referred to as a cleaner 6.

Figure 4:
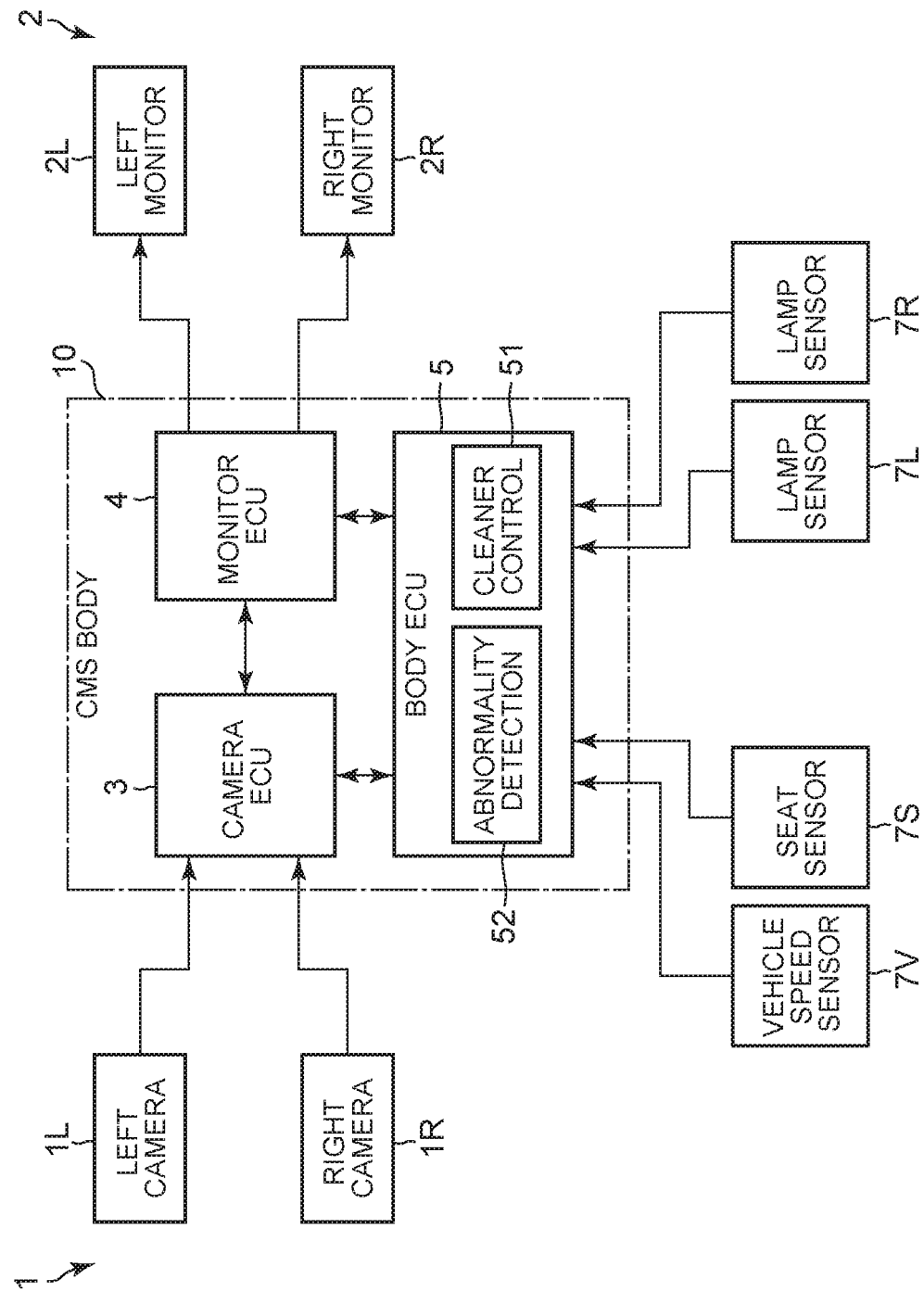
FIG. 4 is a block diagram of a configuration of the CMS.

FIG. 4 is a configuration block diagram of the CMS of the embodiment. The CMS body 10 is provided with: a camera ECU 3 that controls the left and right side cameras 1L, 1R; and a monitor ECU 4 that controls the left and right side monitors 2L, 2R. The camera 1 and the camera ECU 3 constitute the capturing device of the disclosure, and this camera ECU 3 executes signal processing of captured signals captured by the left and right side cameras 1L, 1R and outputs the captured signals as image signals to the monitor ECU 4. The monitor 2 and the monitor ECU 4 constitute the displaying device of the disclosure, and this monitor ECU 4 executes signal processing of the image signals to make them the image signals of a type that conforms to displaying on the monitor 2, and outputs the image signals to the left and right side monitors 2L, 2R.

As an ECU that executes main control of the CMS, a body ECU 5 that is mounted on the vehicle herein is used in the CMS body 10. This body ECU 5 can control the camera ECU 3 and the monitor ECU 4 and can also control the left and right side cameras 1L, 1R and the left and right side monitors 2L, 2R via these ECUs 3, 4. This body ECU 5 functions as the control device of the disclosure.

The body ECU 5 includes a cleaner control device 51 that controls an operation of the cleaner 6, that is, operations of the cleaners 6L, 6R for the left and right side marker lamps L-SML, R-SML. This cleaner control device 51 drives the cleaner 6 to clean the rear surfaces of the outer covers 102 for the side marker lamps.

The body ECU 5 also includes a system abnormality detection device 52 that detects a system abnormality. This system abnormality detection device 52 detects a signal level change of each of the image signals output from the camera 1 to the camera ECU 3, the image signals processed in a signal processing device of the camera ECU 3, and the image signals received by the monitor ECU 4 from the camera ECU 3, recognizes the images on the basis of the image signals, and detects an abnormality in the camera 1 or the camera ECU 3 on the basis of these level changes and a result of the image recognition. That is, the system abnormality detection device 52 detects the abnormality in the capturing device of the system.

As this system abnormality, the following three abnormality modes are detected in the embodiment. "Image quality degradation": a part of the image that is captured by the camera 1 and displayed on the monitor 2 develops a defect, such as being saturated in black or white. A whole or a part of the image is in a state of being out of focus. There is an abnormality in contrast or a color rendering property of the image. "Frozen": a state where the particular captured image remains to be output when the captured image is displayed on the monitor 2. "Complete failure": a state where no image signal is output from the camera 1 or the signal processing is not executed by the camera ECU 3, and, as a result, the monitor ECU 4 does not receive the image signal, and the image cannot be displayed on the monitor 2.

Plural sensors are connected to the body ECU 5. Here, as the sensors, a vehicle speed sensor 7V that detects a vehicle speed of the vehicle, a seat sensor 7S that detects an occupant (a driver) being seated on a driver's seat, and left and right lamp sensors 7L, 7R that respectively detect lit (blinking) states of the LEDs 103 as the lamp light sources of the left and right side marker lamps are provided. These sensors may collectively and simply be referred to as sensors 7. A description will hereinafter be made on a detection operation of the sensors 7.

Vehicle Speed Sensor 7V

The vehicle speed sensor 7V detects the vehicle speed of the vehicle and also detects the following (one example of the state detection device). "Traveling": the vehicle is traveling. "Stopped": the vehicle is stopped.

Seat Sensor 7S

The seat sensor 7S detects whether the occupant (the driver) is seated on the driver's seat and also detects the following (one example of the state detection device). "Present": the driver is seated on the driver's seat. "Absent": the driver is not seated on the driver's seat.

Lamp Sensors 7L, 7R

The lamp sensors 7L, 7R detect the lit states of the LEDs 103, which are the light sources of the left and right side marker lamps, as blinking unlit states of the left and right turn signal lamps (one example of the state detection device). "Right indication": the right turn signal lamp blinks, and the vehicle advances in a right direction. "Left indication": the left turn signal lamp blinks, and the vehicle advances in a left direction. "Straight": both of the left and right turn signal lamps blink or are unlit, and the vehicle is in a straight advancing state, in other words, in a state of not advancing to the left or the right.

When the system abnormality detection device 52 detects the system abnormality, the body ECU 5 refers to detection signals detected by the sensors 7, then controls the monitor ECU 4, controls displaying on the monitor 2, and executes system control. As this system control, the following "cleaner control" and "monitor control" are executed.

Cleaner Control

The body ECU 5 drives the cleaners 6 of the left and right side marker lamps by a cleaner control device 51 to clean the rear surfaces of the outer covers. As modes of this cleaning, "routine cleaning" in which cleaning is performed at preset timing and "instructed cleaning" in which cleaning is performed only when being instructed are available.

Monitor Control (Side Monitors 2L, 2R)

"Unlit": power supplies of the camera 1, the camera ECU 3, the monitor ECU 4, and the monitor 2 are turned OFF to stop the system. "Blackout": the monitor 2 is brought into a standby state, and the camera 1, the camera ECU 3, and the monitor ECU 4 are controlled to be in power saving states. In this state, the entire monitor 2 displays in black; however, the monitor 2 can instantaneously displays the image when being restored to a normal state. "Displaying": the monitor 2 is operated normally and continues displaying the image on the display screen.

A description will be made on control by the CMS that has the configuration described so far with reference to a flowchart in FIG. 6. In a flow F1, in initial setting, the body ECU 5 controls the left and right side monitors 2L, 2R to display the images in the normal states (S11). Next, the body ECU 5 detects whether the vehicle is currently "traveling" or "stopped" from detection output of the vehicle speed sensor 7V (S12). During "traveling", the cleaner control device 51 makes the cleaner 6 perform the "routine cleaning" (S13). Here, cleaning is performed intermittently at specified timing, so as to remove dirt on the rear surface of the outer cover 102 for the side marker lamp.

Next, the system abnormality detection device 52 detects presence or absence of the abnormality (S14). If detecting the abnormality, the system abnormality detection device 52 determines a mode of the abnormality for the side camera 1L or 1R, from which the abnormality is detected (S15). If the abnormality is the "complete failure", the monitor 2L or 2R is controlled to be "unlit" (S16). This means that, if the "complete failure" occurs to the left or right side camera 1L or 1R on the corresponding side, the monitor 2L or 2R on the corresponding side is controlled to be "unlit". If the "complete failure" occurs to both of the left and right side cameras 1L, 1R, both of the monitors 2L, 2R are controlled to be "unlit". In this way, the monitor 2L or 2R on the corresponding side or both of the monitors 2L, 2R do not display the images.

If the abnormality is the "image quality degradation" in step S15, the left or right monitor 2L or 2R on the corresponding side is controlled to "display" the image (S17). If the abnormality occurred to both of left and right monitors 2L, 2R is the "image quality degradation", both of the left and right monitors 2L, 2R are controlled to "display" the images. In this way, although image quality is degraded, the monitor 2L or 2R on the corresponding side or both of the monitors 2L, 2R display the side areas and the rear area.

Figure 6:
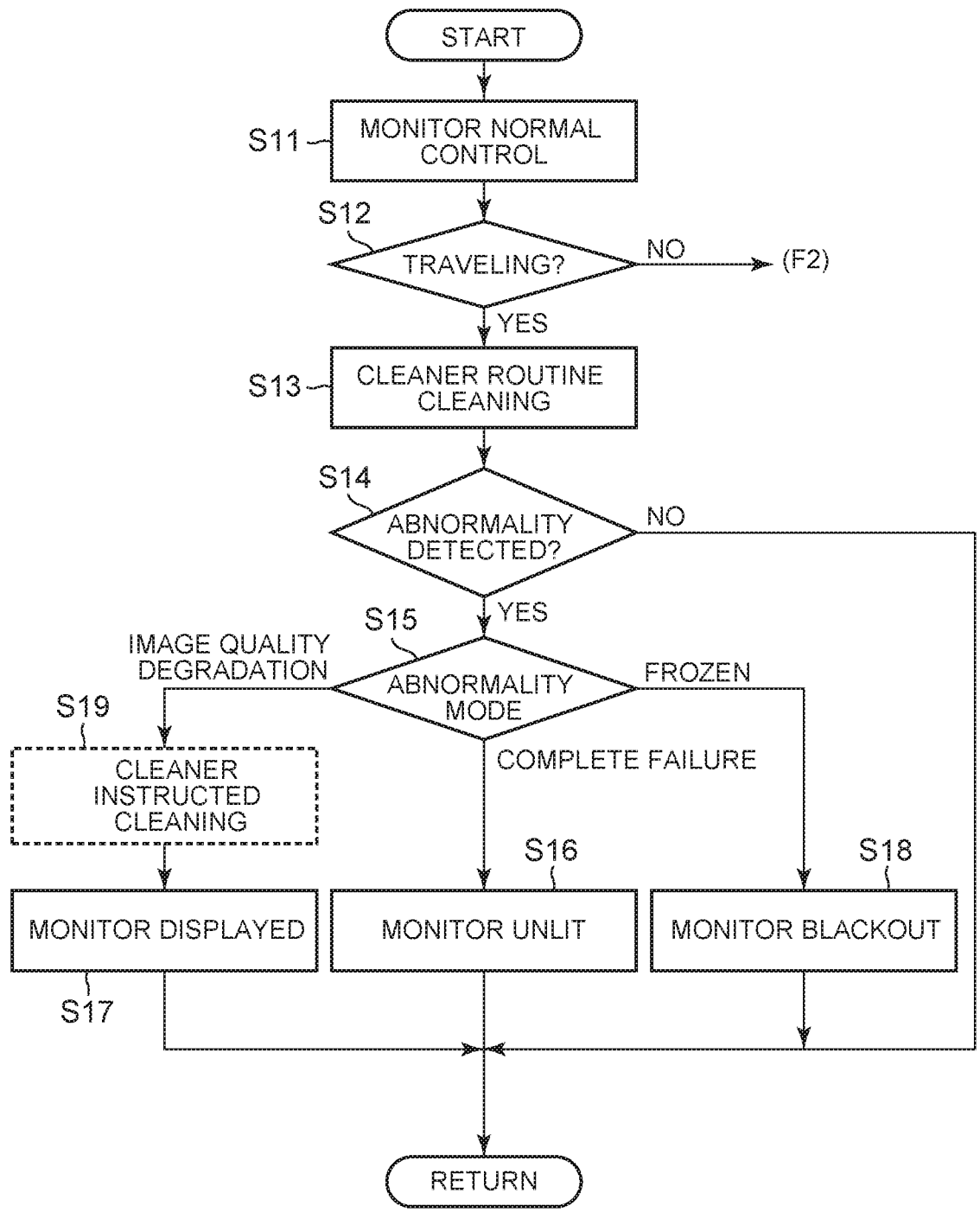
FIG. 6 is a flowchart of a flow F1 in the monitor control.

Note that, in the case of this "image quality degradation", as indicated by a broken line in FIG. 6, the cleaner 6 may be controlled to perform the "instructed cleaning" (S19). When this "instructed cleaning" is performed, the rear surface of the outer cover 102 is cleaned again, and the "image quality degradation" that is caused by the dust, a foreign substance, or the like attached to said rear surface is possibly resolved. In this case, the abnormality is not detected in step S22 in the next loop.

If detecting "frozen" in step S15, the system abnormality detection device 52 controls the left or right side monitors 2L or 2R on the corresponding side to "blackout" (S18). If the left and right side monitors 2L, 2R on both sides are "frozen", both of the monitors 2L, 2R are controlled to "blackout". In this way, the entire monitor 2L or 2R on the corresponding side or the entire monitors 2L, 2R on both of the sides display in black.

Accordingly, when the abnormality occurs to the capturing device in the CMS during traveling of the vehicle, displaying of the monitor 2 as the displaying section, to which the abnormality occurs, is controlled to "unlit", "displaying", or "blackout" in accordance with the mode of the abnormality. When one of the monitors is "unlit" or "blackout", said monitor 2 cannot display the image. Accordingly, the driver recognizes that the abnormality has occurred to the capturing device, and recognizes the side area and the rear area of the vehicle through displaying on the other monitor that normally displays the image. In this way, minimum safety during traveling of the vehicle is secured. Meanwhile, during the "complete failure", power consumption by the camera 1, to which the abnormality occurs, the camera ECU 3, the monitor ECU 4, and the monitor 2 is suppressed. During "frozen", the power consumption by the monitor 2, to which the abnormality occurs, is suppressed.

If the abnormality of the "complete failure" or "frozen" occurs to the monitors 2 on both of the sides, the monitors 2 on both of the sides are brought into the "unlit" or "blackout" state. Accordingly, the driver recognizes that the abnormality has occurred to the capturing devices on both of the sides, and checks the rear area of the vehicle by a rearview mirror or the like, for example. Thus, also in this case, the power consumption by the camera 1, the camera ECU 3, the monitor ECU 4, and the monitor 2 is suppressed.

Figure 7:
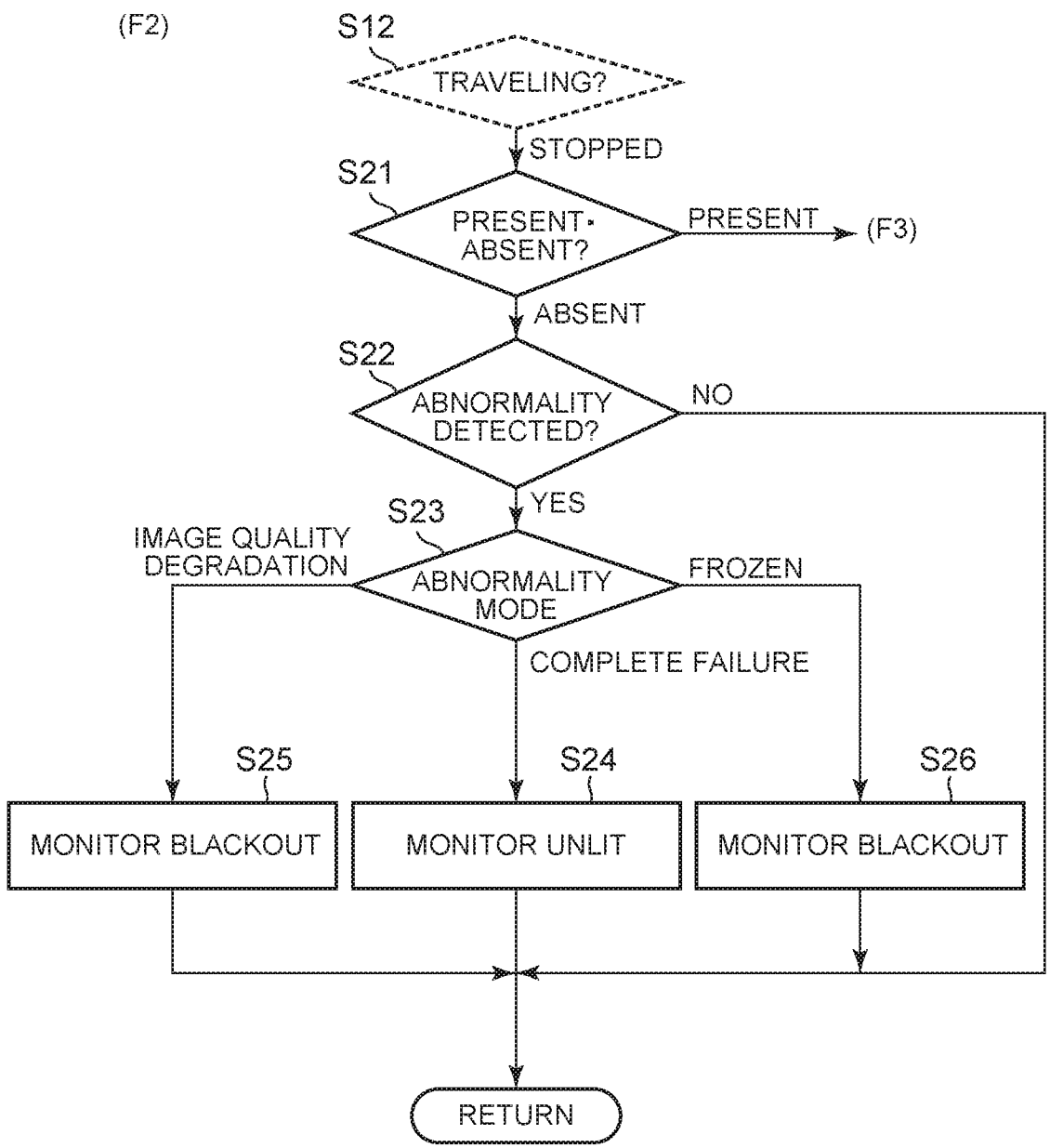
FIG. 7 is a flowchart of a flow F2 in the monitor control.

If "stopped" in step S11 of the flow F1, a flow F2 in FIG. 7 is executed. The seat sensor 7S detects whether the driver is "present" or "absent" (S21). If the driver is "present", the processing is shifted to a flow F3, which will be described below. If the driver is "absent" and the system abnormality detection device 52 detects the abnormality (S22), the mode of the abnormality is determined (S23). If the abnormality is the "complete failure", the left or right side monitor 2L or 2R on the corresponding side is controlled to be "unlit" (S24). If the "complete failure" occurs to the left and right side monitors 2L, 2R on both of the sides, the monitors 2L, 2R on both of the sides are controlled to be "unlit".

If the abnormality is the "image quality degradation" in step S23, the left or right side monitor 2L or 2R on the corresponding side is controlled to "blackout" (S25). If the "image quality degradation" occurs to the left and right side monitors 2L, 2R on both of the sides, the monitors 2L, 2R on both of the sides are controlled to "blackout". In this way, the entire monitor 2L or 2R on the corresponding side or the entire monitors 2L, 2R on both of the sides display in black. In the case of this "image quality degradation", as in step S19 of the flow F1, the cleaner 6 may perform the "instructed cleaning".

If detecting "frozen" in step S23, the system abnormality detection device 52 controls the left or right side monitor 2L or 2R on the corresponding side to "blackout" (S26). If the left and right side monitors 2L, 2R on both of the sides are "frozen", both of the monitors 2L, 2R are controlled to "blackout". In this way, the entire monitor 2L or 2R on the corresponding side or the entire monitors 2L, 2R on both of the sides display in black.

Accordingly, in the cases where the vehicle is stopped, the driver is absent, and the abnormality occurs to the CMS, displaying of the monitor 2 on the side, to which the abnormality occurs, is controlled to "unlit" or "blackout" in accordance with the mode of the abnormality. In the cases where the vehicle is stopped and the driver is absent, a probability of displaying of the monitor 2 being necessary is low. Thus, the image is not actively displayed on the monitor 2. In this way, the power consumption by the camera 1 on the side, to which the abnormality occurs, the camera ECU 3, the monitor ECU 4, and the monitor 2 during a stop of the vehicle is suppressed.

Figure 8:
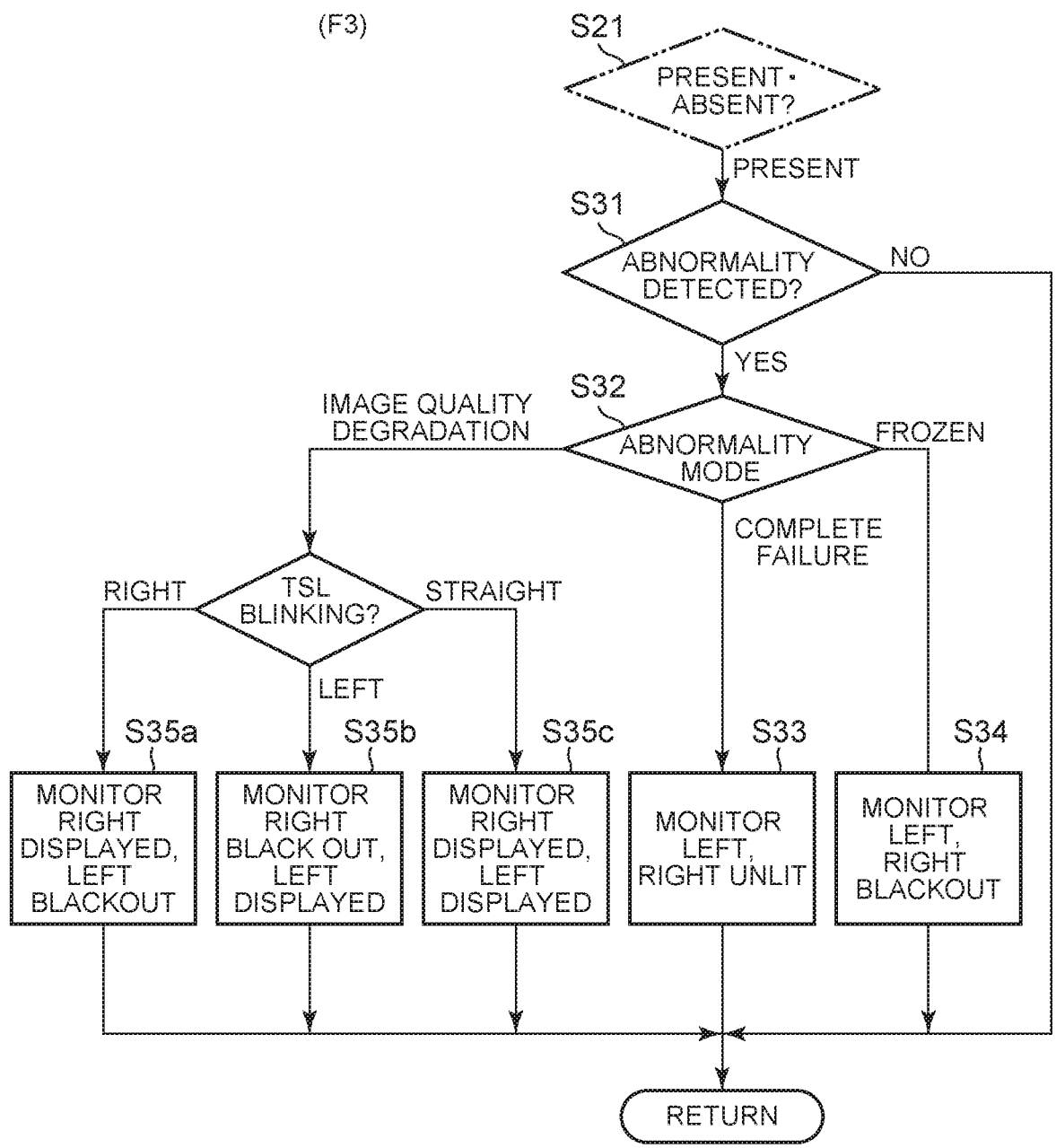
FIG. 8 is a flowchart of a flow F3 in the monitor control.

If "present" in step S21 of the flow F2, a flow F3 in FIG. 8 is executed. If the abnormality is detected (S31), it is determined whether the mode of the abnormality is the "complete failure", "frozen", or the "image quality degradation" (S32). If the mode of the abnormality is the "complete failure", the left and right side monitors 2L, 2R are controlled to be "unlit" (S33).

If the abnormality in step S32 is "frozen", the left and right side monitors 2L, 2R to "blackout" (S34).

If the abnormality is the "image quality degradation" in step S32, the lamp sensors 7L, 7R respectively detect the blinking states of the left and right turn signal lamps and determines whether the left and right turn signal lamps are in the states of the "right indication", the "left indication", or "straight" (S35). If the determination in this step S35 is the "right indication", the right side monitor 2R is controlled to "display" the image, and the left side monitor 2L is controlled to "blackout" (S35a). Meanwhile, if the determination is the "left indication", in contrast with the above, the left side monitor 2L is controlled to "display" the image, and the right side monitor 2R is controlled to "blackout" (S35b). If the determination is "straight", both of the left and right side monitors 2L, 2R are controlled to "display" the images (S35c).

Just as described, when only the right or left turn signal lamp blinks, there is a high possibility that the vehicle advances to the blinked side. Accordingly, although the image quality is degraded, the corresponding left or right side monitor 2L or 2R displays the side area and the rear area on said advancing side. In this way, the driver recognizes the side area and the rear area from the displayed image, and the safety can thereby be secured. Meanwhile, the monitor 2L or 2R on the opposite side is controlled to "blackout", so as to suppress the power consumption.

When the determination is "straight", there is a low possibility that the vehicle starts traveling. However, there is a high possibility that the vehicle starts traveling after a relatively short period of time. Accordingly, the monitors 2L, 2R on both of the sides "display" the images, and the safety is prioritized over the suppression of the power consumption. In this case, necessity of controlling the monitors 2L, 2R to "display" the images is low while the vehicle is stopped. Thus, the monitors 2L, 2R may be controlled to "blackout" so that the monitors 2L, 2R can display the images at the same time as the vehicle starts traveling.

Note that, in the case of this "image quality degradation" in the flow F3, the cleaner 6 may perform the "instructed cleaning" as in step S19 of the flow F1. In addition, in the flow F3, the determinations in steps S32, S33 may simultaneously be made, and the determination on the "complete failure", "frozen", or the "image quality determination" in step S32 and the determination on "straight", the "right indication", or the "left indication" in step S33 may be combined. In this way, a flow in which the monitors 2L, 2R are simultaneously controlled to "display", "blackout", or be "unlit" may be established.

The monitor control in the system control that has been described so far is summarized below in FIG. 5. By executing this monitor control, the recognition using the monitor can be secured while power saving for the entire CMS can be realized under such a situation where the driver has to recognize the side areas to the rear area of the vehicle and a situation where the recognition thereof by the driver is preferred.

Instead of "blackout" during the "image quality degradation" in the embodiment, control to "dim" the monitor 2 may be executed to reduce brightness during "displaying" of the monitor 2. In particular, the monitors 2L, 2R may be controlled to "display" the images or "blackout" in step S35 of the flow F3, or both of the monitors 2L, 2R may be controlled to be "dimmed". This is advantageous to power saving while the safety can be secured.

The control of the CMS in the embodiment is merely one example of the disclosure. Needless to say, modes other than those described in the embodiment can be applied. That is, the modes of the abnormality and the modes of the monitor control may be set to the modes other than those described in the embodiment. Furthermore, the combination of these modes of the abnormality and modes of the control may appropriately be changed.

For example, in the disclosure, as states of the vehicle that is referred in the control of the left and right side monitors, a locked state by a door key, whether the driver touches a steering wheel (a wheel), the seated state of the driver that is analyzed by an image using a vehicle cabin camera, and the like may be adopted.

For example, as shown in FIG. 1, the disclosure can also be applied to a CMS that uses a back camera (a rear camera) 1B provided in a rear section of the vehicle in addition to the left and right side cameras. In this case, an image of an area AB captured by the back camera 1B is displayed on the center monitor 2C, and the images captured by the left and right side monitors 2L, 2R are synthesized to display one sequential image. In this way, these monitors 2C, 2L, 2R can be configured as monitors that display a wide area from the left and right sides to the rear of the vehicle CAR.

Needless to say, the disclosure can be applied to a side marker lamp that does not include the cleaner. Even when the side marker lamp includes the cleaner, the cleaner may be configured to spray cleaning water from a nozzle and clean the surface of the outer cover for the side marker lamp. Alternatively, the cleaner may be configured to clean the surface by using the air and the cleaning water.

Furthermore, the disclosure can also be applied to a vehicle that includes left and right side mirrors. In particular, in a vehicle in which side marker lamps and turn signal lamps are respectively and integrally incorporated in the left and right side mirrors, the side cameras can be incorporated in these lamps.

Instead of being incorporated in the lamps, the side cameras may be incorporated in a body of the vehicle, such as a fender, doors, or pillars.

The CMS of the disclosure does not always have to be configured to constantly execute the power saving control but may be configured to turn off the power saving control (low power consumption control), for example, when the passenger operates a switch, and may be configured that the monitor constantly displays the image normally.

What is claimed is:

1. A camera monitor system comprising:
   left and right cameras respectively capturing images of left and right areas outside of a vehicle;
   left and right displays displaying the images captured by the left and right cameras; and
   a controller detecting an abnormality of each of the left and right cameras and controlling a displaying state of each of the left and right displays based on the detected abnormality, wherein
   the controller individually controls each of the left and right displays to be in a low power consumption state in accordance with a mode of the detected abnormality; and
   the controller controls each of the left and right displays to be in an unlit mode in which a display of the left and right displays corresponding to a camera of the left and right cameras having an abnormality is turned off, a blackout mode in which the display having the abnormality is brought into a standby state, or a display mode in which the display having the abnormality continues to display an image, in accordance with a combination of:
   whether or not the vehicle is traveling, whether or not a driver is in the vehicle, whether or not each of left and right turn signal lamps of the vehicle is in a blinking state, and whether each of the left and right displays is detected to be in a complete failure state, a frozen state, or an image quality degradation state;
   in a case where the controller detects the complete failure state while the vehicle is traveling, the controller controls the display corresponding to the camera from which the complete failure state is detected to be in the unlit mode,
   in a case where the controller detects the frozen state while the vehicle is traveling, the controller controls the display corresponding to the camera from which the frozen state is detected to be in the blackout mode, and
   in a case where the controller detects the image quality degradation state while the vehicle is traveling, the controller controls the display corresponding to the camera from which the image quality degradation state is detected to be in the display mode.

2. The camera monitor system according to claim 1, further comprising:
   a state detector detecting a state of the vehicle, wherein
   the controller controls each of the left and right displays to be in the unlit mode or the blackout mode in accordance with a combination of the detected state of the vehicle and the mode of the detected abnormality.

3. The camera monitor system according to claim 1, further comprising a cleaner for each of the left and right cameras and a cover that covers each of the left and right cameras, and
   when the controller detects the image quality degradation state, the controller controls the cleaner such that the cleaner cleans a surface of the cover that covers the camera from which the image quality degradation state is detected.

4. The camera monitor system according to claim 1, wherein:
   in a case where the controller detects the complete failure state while the vehicle is stopped and a driver is absent, the controller controls the display corresponding to the camera from which the complete failure state is detected to be in the unlit mode,
   in a case where the controller detects the frozen state while the vehicle is stopped and the driver is absent, the controller controls the display corresponding to the camera from which the frozen state is detected to be in the blackout mode, and
   in a case where the controller detects the image quality degradation state while the vehicle is stopped and the driver is absent, the controller controls the display corresponding to the camera from which the image quality degradation state is detected to be in the blackout mode.

5. The camera monitor system according to claim 1, wherein:
   in a case where the controller detects the complete failure state while the vehicle is stopped and the driver is present, the controller controls the display corresponding to the camera from which the complete failure state is detected to be in the unlit mode,
   in a case where the controller detects the frozen state while the vehicle is stopped and the driver is present, the controller controls the display corresponding to the camera from which the frozen state is detected to be in the blackout mode, and
   in a case where the controller detects the image quality degradation state while the vehicle is stopped and the driver is present, the controller controls the display corresponding to the camera from which the image quality degradation state is detected in accordance with the following:
   in a case where the right turn signal lamp is in the blinking state, the right display is controlled to display while the left display is in the blackout mode,
   in a case where the left turn signal lamp is in the blinking state, the left display is controlled to display while the right display is in the blackout mode, and
   in a case where both the left and right turn signal lamps are in the blinking state or both the left and right turn signal lamps are unlit, the right and left displays are controlled to display.

* * * * *